July 28, 1942.　　　O. M. RYBOLT　　　2,291,107

SOCKET SUPPORT FOR ELECTRICAL OUTLET BOXES

Filed Aug. 5, 1939

INVENTOR.
Ora M. Rybolt
BY
ATTORNEY.

Patented July 28, 1942

2,291,107

UNITED STATES PATENT OFFICE 2,291,107

SOCKET SUPPORT FOR ELECTRICAL OUTLET BOXES

Ora M. Rybolt, Detroit, Mich., assignor of one-half to Julius C. Lowry, Detroit, Mich.

Application August 5, 1939, Serial No. 288,558

2 Claims. (Cl. 174—58)

This invention relates to socket supports for electrical outlet boxes, the object of the invention being to provide a means for supporting the socket from displacement inwardly of the outlet box by introduction of the plug in the socket, whereby the base of the socket or sockets are maintained practically flush with the aperture therefor in a face plate which is fastened to the socket.

Heretofore the socket elements in many cases have been sustained by the wiring leading thereto which is encased and is comparatively stiff and yet in the installation thereof may not be brought outwardly of the opening at the side of the box a sufficient distance whereby, in introduction of a screw to attach the face plate to the socket, the plate is flexed centrally and oftentimes cracks, due to pressure of the screw head thereon.

This invention seeks to provide a simple and inexpensive socket supporting means which consists of a thin metal plate having its opposite ends supported on the side walls of the opening for the box and having a slot through which a screw may extend into the flange or ear provided on the outlet box. These supporting plates are sufficiently stiff to prevent deflection by introduction of the screw through the slot into the outlet box which has threaded apertures therefor and by which construction and arrangement the face of the socket is maintained substantially flush with the outer surface of the face plate and prevents displacement of the socket from position by introduction of the plug.

These and other objects and features of the invention are hereinafter more fully described and claimed and a socket support for electrical outlet boxes embodying my invention is shown in the accompanying drawing in which—

Figure 1:
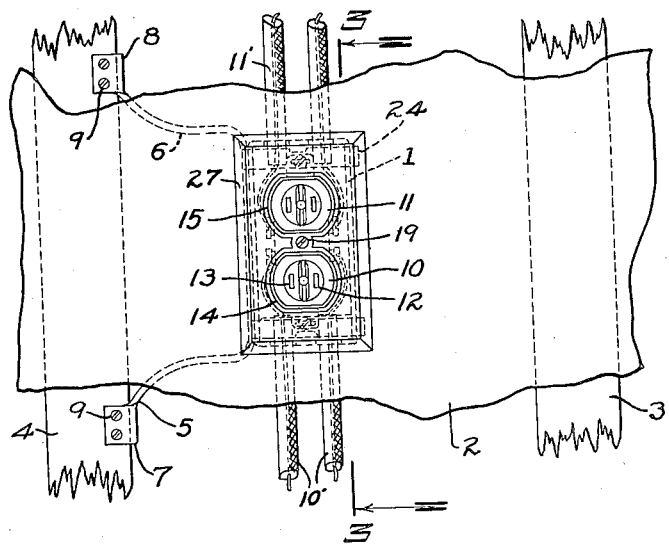
Fig. 1 is a face view of an outlet box supported in the walls of a building.

Electrical outlet boxes are of various forms and sizes some adapted for positioning in a concrete wall and others adapted for use in various other types of structures requiring electrical outlet boxes. In the form here shown the outlet box 1 is set in a plastered wall 2 between the studdings 3 and 4 and is supported in position by bracket portions 5 and 6 having terminal portions 7 and 8 to fit the studding 4 and screws 9 are provided to secure these brackets to the studding.

This invention is not confined to the particular form of outlet box here shown or its manner of support in a building structure and may be of a form for a single or a number of sockets.

In the form here shown there are two sockets 10 and 11 having the usual apertures 12 and 13 for the prongs of a plug (not here shown) having the usual wires leading to an electrical fixture. Source of current is provided by the respective encased wires 10' and 11'.

Figure 3:
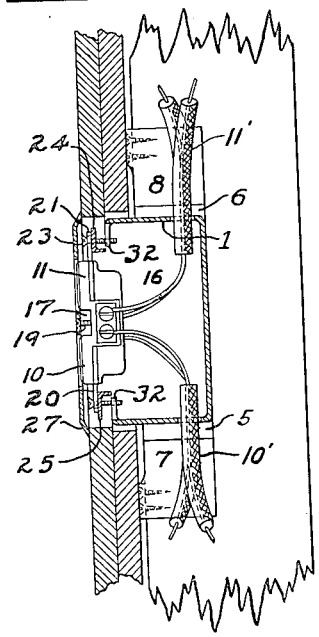
Fig. 3 is a section taken on line 3—3 of Fig. 1.

A base plate, which is shown in full lines in Fig. 1, has apertures 14 and 15 in which the outer end of the sockets are positioned substantially flush with the outer surface of the face plate as will be understood from Fig. 3. The two sockets as here shown are formed with a single base 16 and between the same is a recess 17 having a threaded aperture 18 in its bottom to receive a screw 19 extending through an opening in the portion of the face plate positioned between the socket elements 14 and 15 as will be understood from Fig. 1.

On each opposite end of the socket member, which is usually formed of a plastic body, ears 20 and 21 extend therefrom and are each provided with a similar slot 22 through which a fastening screw 23, in each case, extends into a lug 32 provided at opposite ends of the box.

Figure 2:
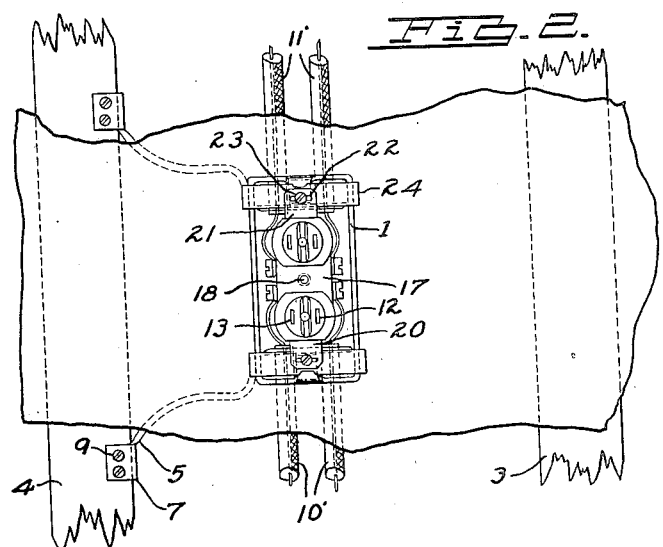
Fig. 2 is a similar view with the face plate removed.

In order that the sockets may be rigidly supported in position with the outer faces thereof practically flush with the outer surface of the face plate, I provide socket supporting members 24 and 25 each of which has a slot 26 in its outer face practically aligning with the slot 22 in the lugs 20 or 21 as the case may be. These supporting elements are of greater length than the width of the opening in the wall to receive the box and less in length than the width of the face plate which, as will be understood from Fig. 2, has an inturned peripheral flange 27. Thus the supporting elements are entirely covered by the face plate when secured in place by the screw 19.

Figures 4, 5:
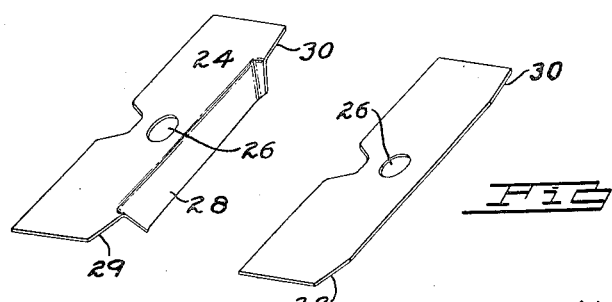
Fig. 4 is a perspective view of one form of the socket supporting element.
Fig. 5 is a perspective view of an alternative form of socket supporting element.

In the form of supporting element shown in Fig. 4 a flange 28 is provided at a right angle to the face of the element to stiffen the same or the supporting element may be formed without a stiffening flange as shown in Fig. 5. In either case, however, the terminal ends 29 and 30 rest on the edge of the plaster wall about the opening in the arrangement here shown and the socket has the lugs 20 and 21 secured to the outer face of the supporting element 24. Therefore the sockets may not be pressed inwardly by introduction of the plug to thereby place excessive strain on the face plate nor may the workmen in wiring the outlet box locate the sockets so far inwardly of the box that, in fastening the face plate thereto by the screw 19, the face plate may be split by the pressure.

The feature of the invention, therefore, resides in the provision of socket supporting elements spanning the opening in which the socket elements are positioned and requiring the workmen, in the assembly of sockets and wiring, to position the socket element or elements outwardly of the opening to practically flush with the outer surface of the face plate and preventing subsequent displacement of the socket element inwardly through introduction of the plug of the circuit to be connected therewith.

It is believed evident from the foregoing description that the various objects and features of the invention are attained by the structure described.

Having thus fully described my invention, its utility and mode of operation, what I claim and desire to secure by Letters Patent of the United States is—

1. A socket support for use in securing a socket in position in an electric outlet box adapted to be mounted in a wall opening, said socket having an apertured ear, said socket support comprising a sheet metal strip of greater length than the width of the box and having a flange at one edge less in length than the length of the strip, said flange extending at an angle to the plane of the strip providing thin flat end portions adapted to overlie the respective side edges of the wall opening and further having an aperture in the body intermediate the ends of the strip, and means insertible through said aperture into the aperture in the socket ear to secure the strip to the outlet box.

2. A socket support for use in securing a socket in position in an electric outlet box adapted to be mounted in a wall opening, said socket having a pair of oppositely disposed apertured ears and said box having an apertured lug for alignment with each ear, said socket support comprising a sheet metal strip for each ear of greater length than the width of the box and each having an aperture for alignment with the aperture of the respective socket ear and apertured lug, each of the strips having a flange at the edge thereof facing the other less in length than the length of the respective strip and extending at an angle to the plane thereof providing flat end portions adapted to overlie the respective opposite side edges of the wall opening, and means insertible through the apertures of each strip and the aperture in the respective socket ear and apertured lug to secure the strips to the respective lugs of the outlet box.

ORA M. RYBOLT.